United States Patent
Jermyn, Jr.

[11] Patent Number: 6,065,896
[45] Date of Patent: May 23, 2000

[54] LEVER DEVICE WITH SUPPORT AND LATCH

[75] Inventor: Richard A. Jermyn, Jr., Panama City, Fla.

[73] Assignee: The United States of America as represented by the Secretary of the Navy, Washington, D.C.

[21] Appl. No.: 09/045,965

[22] Filed: Mar. 18, 1998

[51] Int. Cl.[7] .................................................. F16B 7/00
[52] U.S. Cl. .................. 403/322.4; 403/322.1; 403/65; 403/119; 403/324; 244/137.4
[58] Field of Search .................. 403/322.1, 321, 403/322.4, 324, 325, 65, 119; 244/137.4

[56] References Cited

U.S. PATENT DOCUMENTS

| | | | |
|---|---|---|---|
| 4,037,488 | 7/1977 | Laney, Sr. .................. | 403/322.4 X |
| 5,281,045 | 1/1994 | Ichikawa .................. | 403/325 X |
| 5,456,135 | 10/1995 | Li .................. | 403/325 X |
| 5,458,431 | 10/1995 | Ferreol-Ragotin .................. | 403/325 X |

Primary Examiner—Terry Lee Melius
Assistant Examiner—John R. Cottingham
Attorney, Agent, or Firm—Harvey A. Gilbert; Donald G. Peck

[57] ABSTRACT

A device for positioning a spring-loaded or sliding mechanism includes a pivoting lever and a fixed support arm in a substantially parallel and adjacent relationship to the spring-loaded or slide mechanism. The lever incorporates a hollowed-out portion that receives one end of the spring-loaded or slide mechanism and a portion of the support arm therein. The spring-loaded or slide mechanism is hingedly coupled to the lever at the hollowed-out portion. The hollowed-out portion is further sized to allow the support arm to pass therethough. A latch mechanism is incorporated in part on the support arm and in part on the lever at the hollowed-out portion. In use, the lever moves the spring-loaded or slide mechanism between a first position and a second position as the lever is supported by the support arm passing through the hollowed-out portion. The latch mechanism can be engaged to maintain the spring-loaded or slide mechanism in at least one of the first and second positions.

20 Claims, 2 Drawing Sheets

LEVER DEVICE WITH SUPPORT AND LATCH

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to lever devices, and more particularly to a lever device that incorporates a support and latch for a slide or spring mechanism such as a spring-loaded bolt.

BACKGROUND OF THE INVENTION

Restraining mechanisms such as slide bolts and spring-loaded bolts are used in a variety of applications to restrain movement or lock components together. In one such application, the U.S. Navy uses a spring-loaded bolt to restrain a mine hunting device on a helicopter. The bolt is operated by means of a pull handle coupled to the bolt through a cable that is passed over a pulley. To disengage the bolt from its engagement hole or sleeve against a spring force, the handle is pulled with the cable being tensioned through the pulley to counter the spring force. The bolt can be locked in its disengaged position by locking the handle in place. There are several disadvantages to this arrangement.

A first disadvantage is that force can only be applied in one direction so the bolt cannot be forcibly urged into its engaged position. Rather, the bolt can only be returned to its engaged position by means of the spring force. However, problems such as slight misalignment between the bolt and its engaging hole, or sleeve or frictional loads experienced during the movement of the bolt, can prevent the bolt from moving into its engaged position. In response to such a situation, an operator tends to jiggle or push on the pull handle. Since this does not overcome any of the misalignment or frictional load forces, this does nothing to urge the bolt into its engaged position. Furthermore, jiggling or pushing the pull handle generally causes slack in the cable which can cause the cable to disengage from the pulley. Still another disadvantage is that the pull handle and cable offer no mechanical advantage when trying to overcome the spring force to withdraw the bolt. That is, a pull on the handle is transferred directly along the cable which is coupled in-line with the bolt. Thus, one must actually pull with a force greater than the spring force plus any other frictional forces. In addition, for applications requiring a large pull force, the locking of the pull handle after the bolt has been disengaged can be a struggle.

SUMMARY OF THE INVENTION

Accordingly, it is an object of the present invention to provide a device for positioning a slide bolt, spring-loaded bolt or other spring-loaded mechanism.

Another object of the present invention is to provide a device for positioning a spring-loaded bolt or other spring-loaded mechanism that requires less force to operate than the spring force of the bolt or other mechanism.

Still another object of the present invention is to provide a device that can be operated to both oppose and work with the spring force of a spring-loaded bolt or other mechanism in order to position same.

Other objects and advantages of the present invention will become more obvious hereinafter in the specification and drawings.

In accordance with the present invention, a device for positioning a spring-loaded or sliding mechanism includes a lever having a terminal end hingedly coupled at a hinge point to a fixed reference. The lever has a free end that serves as a handle. A fixed support arm is provided substantially parallel and adjacent to the spring-loaded or slide mechanism. The lever incorporates a hollowed-out portion between the terminal end and the handle. The hollowed-out portion receives one end of the spring-loaded or slide mechanism and a portion of the support arm therein. The spring-loaded or slide mechanism is hingedly coupled to the lever at the hollowed-out portion. The hollowed-out portion is further sized to allow the support arm to pass therethough. A latch mechanism is incorporated in part on the support arm and in part on the lever at the hollowed-out portion. In use, the lever is pivoted about the hinge point to move the spring-loaded or slide mechanism between a first position and a second position as the lever is supported by the support arm passing through the hollowed-out portion. The latch mechanism can be engaged to maintain the spring-loaded or slide mechanism in at least one of the first and second positions.

DETAILED DESCRIPTION OF THE INVENTION

Figure 1:
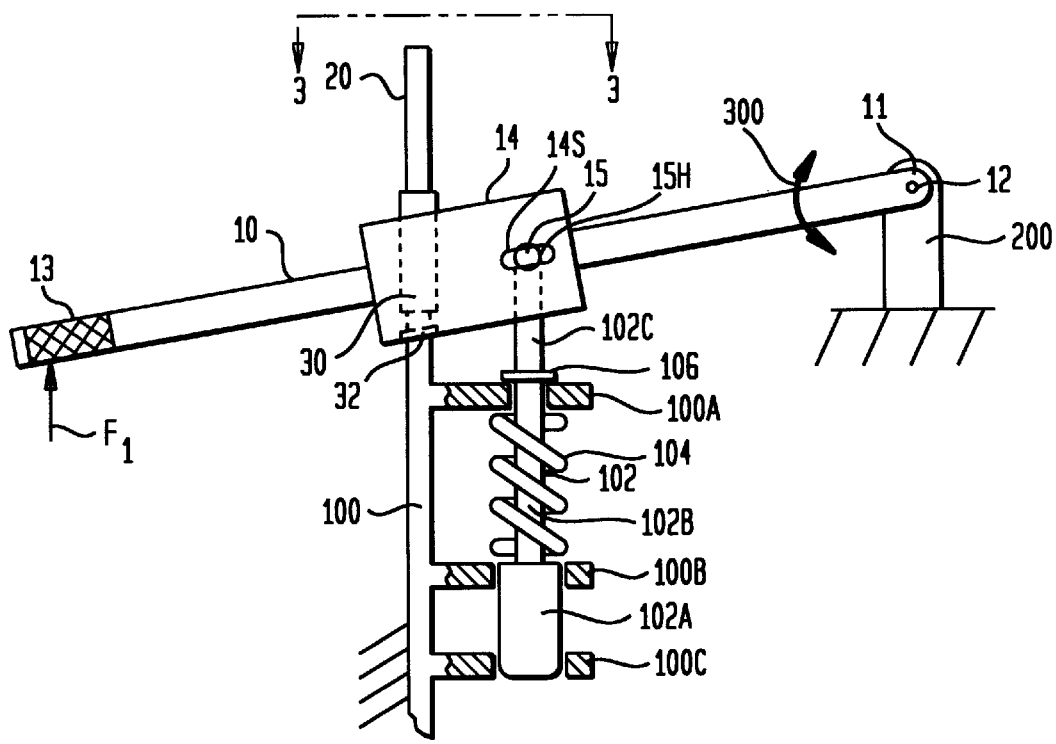
FIG. 1 is a top plan view of one embodiment of a device for positioning a spring-loaded bolt in accordance with the present invention where the device has positioned the bolt in its engaged position.
Figure 2:
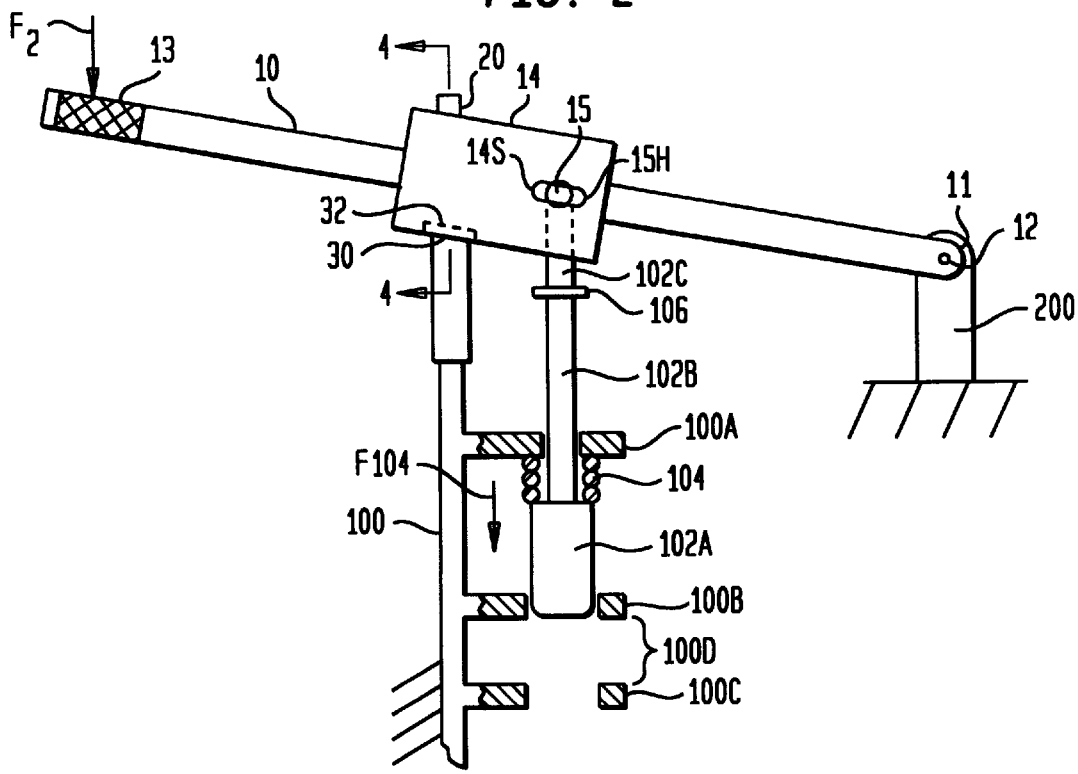
FIG. 2 is a top plan view of the device shown in FIG. 1 where the device has operated to position the bolt in its disengaged position.

Referring now to the drawings and more particularly to FIGS. 1 and 2, one embodiment of the present invention is shown coupled to a spring-loaded bolt for moving same between its engaged position (FIG. 1) and its disengaged position (FIG. 2). While the present invention will be described for use with a spring-loaded bolt, it is to be understood that the present invention can also be used to position any spring-loaded mechanism or a slide bolt having no spring mechanism.

In the illustrated example, a frame 100 defines a plurality of collars 100A, 100B and 100C for axially supporting a bolt 102 in, for example, a horizontal orientation. Bolt 102 includes a larger diameter head portion 102A and a smaller-diameter shaft portion 102B. A spring 104 is fitted over shaft portion 102B with one end of spring 104 bearing against head portion 102A. The other end of spring 104 bears against one side of collar 100A. On the opposite side of collar 100A, a retainer 106 is coupled to shaft 102B to prevent bolt 102 from completely passing through collar 100A under the force of spring 104. Shaft 102B can include an extension portion 102C if needed for coupling to the present invention. For purpose of this description it is assumed that bolt 102 is in its engaged position when head portion 102A resides between collars 100B and 100C as illustrated in FIG. 1. A spring-loaded bolt constructed in this fashion is used to restrain the U.S. Navy's AN/AQS-14 mine hunting device to a helicopter.

The device of the present invention used to position bolt 102 includes a lever 10 coupled to bolt 102, a support arm 20 attached to frame 100, and a latch mechanism having one portion 30 maintained on support arm 20 and another portion 32 maintained on lever 10. Lever 10 has a terminal end 11 that is hingedly coupled at a hinge point 12 to a frame or fixed reference 200. Fixed reference 200 is typically a part of support frame 100 although this need not be the case. In the illustrated embodiment, lever 10 extends in a straight-line fashion to its free end 13 which serves as a handle. Free end 13 can be knurled as shown or have a hand grip attached thereto. Between hinge point 12 and free end 13, lever 10 incorporates an in-line hollow housing 14 that is attached to or made integral with the portions of lever 10 leading to ends 11 and 13. Housing 14 is hollowed-out to receive shaft extension portion 102C therein and to receive support arm 20 therethrough.

Housing 14 is hingedly coupled to shaft extension portion 102C so that lever 10 moves in an arc pivoted about hinge point 12 as indicated by two-headed arrow 300. By way of illustrative example, a pin 15 passes through shaft extension portion 102C on either side of housing 14. Pin 15 is slidingly engaged in shaft extension portion 102C. Further, housing 14 is slotted at either side thereof, as indicated at 14S, to slidingly receive pin 15. Pin 15 can incorporate a head 15H at either end thereof to keep pin 15 properly positioned in slot 14S. Alternatively, shaft extension portion 102C can be slotted where it receives pin 15 therethrough.

Figure 3:
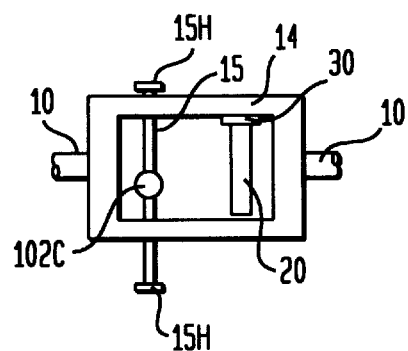
FIG. 3 is a side view taken along line 3—3 of FIG. 1 depicting the hollowed-out housing supported by the support arm.

Support arm 20 is fixed to and extends from frame 100 such that it is substantially parallel to bolt 102, i.e., parallel to shaft extension 102C. Accordingly, in the illustrated example, support arm 20 is also maintained in a horizontal orientation adjacent bolt 102. As best seen in FIG. 3, housing 14 and support arm 20 are sized such that the weight of housing 14 (and the rest of lever 10) bears on support arm 20 and not on bolt 102.

Figure 4:
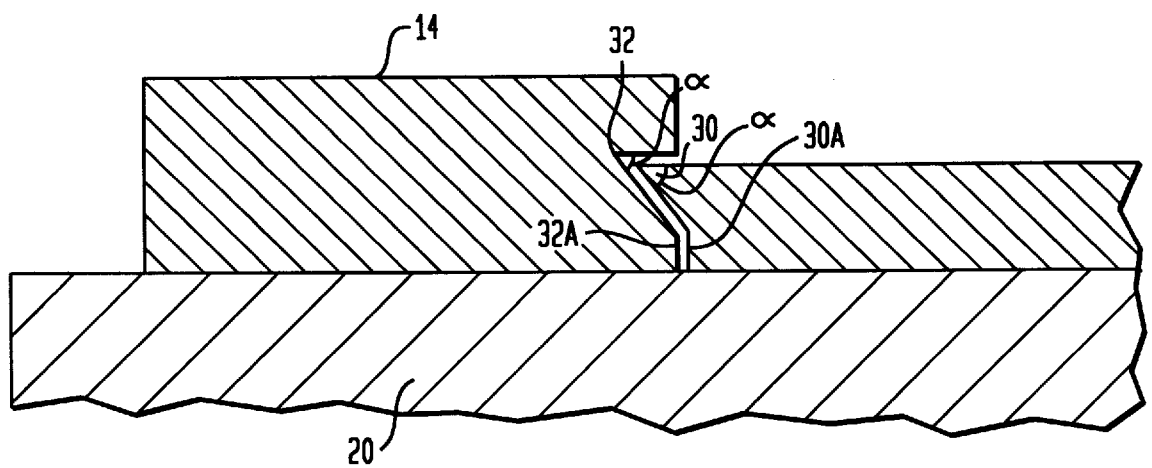
FIG. 4 is an enlarged cross-sectional view of a portion of the device taken along line 4—4 of FIG. 2 showing the latching mechanism of the present invention used to maintain the spring-loaded bolt in its disengaged position.

As best seen in FIG. 4, the latch mechanism in the illustrated embodiment has a latch 30 in the form of a tooth and a catch 32 in the form of a notch. Latch tooth 30 extends along the edge of a plate 31 which is attached to or made integral with support arm 20. Catch notch 32 is formed in housing 14. Latch tooth 30 defines an acute angle $\alpha$ at its apex. To receive latch tooth 30, catch notch 32 is cut into housing 14 to define the same acute angle $\alpha$.

Operation of the present invention to first disengage and then engage bolt 102 will now be explained. To disengage bolt 102 from its engaged position in FIG. 1, a force is applied to free end 13 in the direction of force arrow $F_1$. Force $F_1$, in conjunction with the mechanical advantage provided by the present invention, can be smaller than the force of spring 104 and yet still be sufficient to overcome the force of spring 104. Under force $F_1$, lever 10 (via housing 14) is guided along support arm 20 to move bolt 102 axially and parallel to support arm 20. Even if force $F_1$ is angled (i.e., into or out of the paper as well as upward), support arm 20 bears the angled force component since pin 15 is loosely engaged in shaft extension portion 102C. In this way, bolt 102 experiences only the component of force $F_1$ that is directed axially therealong so as to maintain both the integrity of bolt 102 and its proper orientation relative to frame 100.

Once fully disengaged (i.e., head portion 102A is clear of collar 100C such that a free area 100D, as shown in FIG. 2, is defined between collars 100B and 100C), latch tooth 30 is engaged in catch notch 32 as illustrated in FIG. 4. The force of spring 104, indicated in FIG. 2 by force arrow $F_{104}$, is transferred to housing 14 so that catch notch 32 remains engaged with latch tooth 30. Since each apex of latch tooth 30 and catch notch 32 is formed using the same angle $\alpha$, full surface contact is maintained to maximize frictional forces therebetween. Latch tooth 30 and catch notch 32 can each be extended to form mating flat stop portions 30A and 32A. If present, flat stop portions 30A and 32A bear spring force $F_{104}$ as opposed to the tip of latch tooth 30 thereby prolonging the life of latch tooth 30.

One method of returning bolt 102 to its engaged position is to again apply force $F_1$ to free end 13 as shown in FIG. 2 in order to disengage latch tooth 30 from catch notch 32. Then, spring force $F_{104}$ could be allowed to restore bolt 102 to the engaged position (FIG. 1) with the operator merely guiding lever 10 such that latch tooth 30 misses catch notch 32. This is made possible because the height of the hollowed-out portion of housing 14 is greater than the height of support arm 20 as best seen in FIG. 3. In other words, the operator merely lifts up (i.e., out of the paper) on free end 13 so that latch tooth 30 misses catch notch 32.

Another method of returning bolt 102 to its engaged position is made possible by the angled formation of latch tooth 30 and catch notch 32. More specifically, an operator could merely lift up (i.e., out of the paper) on free end 13 and latch tooth 30 will slide out of catch notch 32. Accordingly, acute angled $\alpha$ determines how much upward force is required to disengage latch tooth 30 from catch notch 32 with larger ones of angle $\alpha$ requiring less force than smaller ones of angle $\alpha$.

In returning bolt 102 to its engaged position, the present invention makes it possible to apply a force $F_2$ that works with spring force $F_{104}$. Further, since support arm 20 bears any angled component of force $F_2$, bolt 102 will only experience the component of force $F_2$ that is axially aligned therewith. Thus, the present invention guarantees the structural integrity of bolt 102 while allowing the application of a force to overcome any misalignment or frictional loads experienced by bolt 102.

The advantages of the present invention are numerous. The bolt can be forced into both its engaged and disengaged positions with a mechanical advantage. The device can be operated by one hand to both position and lock the bolt in its disengaged position. The device can also be operated single-handedly to unlock same and return the bolt to its engaged position.

Although the invention has been described relative to a specific embodiment thereof, there are numerous variations and modifications that will be readily apparent to those skilled in the art in light of the above teachings. For example, the present invention could be used to operate any slide bolt or any spring-loaded mechanism to which a shaft (similar to shaft extension portion 102C) can be coupled so as to be in alignment with the spring force acting on the mechanism. The device could be made from any rigid material capable of performing the intended function. Still further, an additional locking mechanism can be provided to lock lever 10 to support arm 20 in order to maintain the bolt in its engaged position. It is therefore to be understood that, within the scope of the appended claims, the invention may be practiced other than as specifically described.

What is claimed as new and desired to be secured by Letters Patent of the United States is:

1. A lever device comprising:

a slide bolt;

a lever having a terminal end hingedly coupled at a hinge point to a fixed reference, said lever having a free end serving as a handle;

a fixed support arm being substantially parallel and adjacent to said slide bolt;

said lever incorporating a hollowed-out portion between said terminal end and said handle, said hollowed-out portion receiving one end of said slide bolt and a portion of said support arm therein, said one end of said slide bolt being hingedly coupled to said lever at said hollowed-out portion, said hollowed-out portion being sized to allow said support arm to pass therethrough; and a latch incorporated in part on said support arm and in part on said lever at said hollowed-out portion, wherein said lever is pivoted about said hinge point to move said slide bolt between a first position and a second position with said lever being supported by said support arm passing through said hollowed-out portion, and wherein said latch can be engaged to maintain said slide bolt in at least one of said first position and said second position.

2. A device as in claim 1 wherein said handle, said hollowed-out portion and said terminal end of said lever are arranged in a straightline configuration.

3. A device as in claim 1 wherein said one end of said slide bolt being hingedly coupled to said lever at said hollowed-out portion comprises a pin passing perpendicularly through said one end of said slide bolt and supported at either end thereof by said hollowed-out portion.

4. A device as in claim 3 wherein each said either end of said pin cooperates with said hollowed-out portion to allow said lever to pivot about said hinge point in an arc.

5. A device as in claim 4 wherein said hollowed-out portion of said lever is slotted where said pin cooperates therewith.

6. A lever device comprising:

a spring-loaded bolt;

a lever having a terminal end hingedly coupled at a hinge point to a fixed reference, said lever having a free end serving as a handle;

a fixed support arm being substantially parallel and adjacent to said spring-loaded bolt;

said lever incorporating a hollowed-out portion between said terminal end and said handle, said hollowed-out portion receiving one end of said spring-loaded bolt and a portion of said support arm therein, said one end of said spring-loaded bolt being hingedly coupled to said lever at said hollowed-out portion, said hollowed-out portion being sized to allow said support arm to pass therethrough; and a latch incorporated in part on said support arm and in part on said lever at said hollowed-out portion wherein, when said lever is pivoted about said hinge point to move said spring-loaded bolt against a spring force thereof, said lever is supported by said support arm passing through said hollowed-out portion, and wherein said latch can be engaged to maintain said spring-loaded bolt in a position against said spring force.

7. A device as in claim 6 wherein said latch comprises a tooth and a notch engaged with one another wherein said spring force tends to maintain said tooth in said notch.

8. A device as in claim 7 wherein said tooth and said notch terminate at an acute angle that is the same.

9. A device as in claim 6 wherein said handle, said hollowed-out portion and said terminal end of said lever are arranged in a straightline configuration.

10. A device as in claim 6 wherein said one end of said spring-loaded bolt being hingedly coupled to said lever at said hollowed-out portion comprises a pin passing perpendicularly through said one end of said spring-loaded bolt and supported at either end thereof by said hollowed-out portion.

11. A device as in claim 10 wherein each said either end of said pin cooperates with said hollowed-out portion to allow said lever to pivot about said hinge point in an arc.

12. A device as in claim 11 wherein said hollowed-out portion of said lever is slotted where said pin cooperates therewith.

13. A lever device comprising:

a spring-loaded mechanism;

a shaft coupled to and extending from said spring-loaded mechanism, said shaft being aligned with a direction of a spring force of said spring-loaded mechanism;

a lever having a terminal end hingedly coupled at a hinge point to a fixed reference, said lever having a free end serving as a handle;

a fixed support arm being substantially parallel and adjacent to said shaft;

said lever incorporating a hollowed-out portion between said terminal end and said handle, said hollowed-out portion receiving one end of said shaft and a portion of said support arm therein, said one end of said shaft being hingedly coupled to said lever at said hollowed-out portion, said hollowed-out portion being sized to allow said support arm to pass therethrough; and a latch incorporated in part on said support arm and in part on said lever at said hollowed-out portion, wherein said lever is pivoted about said hinge point to move said shaft against said spring force with said lever being supported by said support arm passing through said hollowed-out portion, and wherein said latch can be engaged to maintain said spring-loaded mechanism in a position against said spring force.

14. A device as in claim 13 wherein said latch comprises a tooth and a notch engaged with one another wherein said spring force tends to maintain said tooth in said notch.

15. A device as in claim 14 wherein said tooth and said notch terminate at an acute angle that is the same.

16. A device as in claim 13 wherein said handle, said hollowed-out portion and said terminal end of said lever are arranged in a straightline configuration.

17. A device as in claim 13 wherein said one end of said spring-loaded bolt being hingedly coupled to said lever at said hollowed-out portion comprises a pin passing perpendicularly through said one end of said spring-loaded bolt and supported at either end thereof by said hollowed-out portion.

18. A device as in claim 17 wherein each said either end of said pin cooperates with said hollowed-out portion to allow said lever to pivot about said hinge point in an arc.

19. A device as in claim 18 wherein said hollowed-out portion of said lever is slotted where said pin cooperates therewith.

20. A lever device comprising:

a lever having a terminal end hingedly coupled at a hinge point to a fixed reference, said lever having a free end serving as a handle, said lever incorporating a hollow housing between said terminal end and said handle;

a fixed support arm passing freely through said hollow housing wherein said lever can slide along said support arm when said lever is pivoted about said hinge point;

a pin supported loosely in said hollow housing such that said pin can move in directions that are perpendicular and parallel to said lever, said pin serving as a point of attachment for a work piece; and a latch incorporated in part on said support arm and in part on said lever for latching said lever to said support arm.

* * * * *